United States Patent
Oshimi

(10) Patent No.: US 8,028,515 B2
(45) Date of Patent: Oct. 4, 2011

(54) EXHAUST CONTROLLING DEVICE FOR DIRECT CYLINDER FUEL INJECTED SPARK IGNITION ENGINE

(75) Inventor: Youichi Oshimi, Machida (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 494 days.

(21) Appl. No.: 12/340,011

(22) Filed: Dec. 19, 2008

(65) Prior Publication Data

US 2009/0158711 A1    Jun. 25, 2009

(30) Foreign Application Priority Data

Dec. 25, 2007   (JP) ................................. 2007-332276

(51) Int. Cl.
*F01N 3/00*   (2006.01)
(52) U.S. Cl. ................ 60/286; 60/274; 60/285; 60/301; 60/303
(58) Field of Classification Search ............... 60/274, 60/285, 286, 295, 301, 303
See application file for complete search history.

(56) References Cited

U.S. PATENT DOCUMENTS

| | | | |
|---|---|---|---|
| 6,644,018 B2 * | 11/2003 | Taga | 60/285 |
| 6,708,668 B2 * | 3/2004 | Yoshida et al. | 123/295 |
| 6,725,649 B2 * | 4/2004 | Yamashita et al. | 60/284 |
| 6,772,585 B2 * | 8/2004 | Iihoshi et al. | 60/277 |
| 7,191,589 B2 * | 3/2007 | Yasui et al. | 60/284 |
| 7,958,720 B2 * | 6/2011 | Okamoto et al. | 60/284 |

FOREIGN PATENT DOCUMENTS

JP   11-82079   3/1999

* cited by examiner

*Primary Examiner* — Binh Q. Tran
(74) *Attorney, Agent, or Firm* — Drinker Biddle & Reath LLP

(57) ABSTRACT

An engine exhaust controlling device is provided, including a controller for detecting whether or not a request is present for activating a catalyst when the engine is started, and whether or not a fuel pressure meets or exceeds a predetermined pressure. When a request is not present, the engine is operated in a homogeneous combustion mode in which fuel is injected during the intake stroke and ignition occurs before compression top dead center. When a request is present, an intake valve characteristic is adjusted to be larger than when the request is not present. If the fuel pressure is not greater than or equal to the predetermined fuel pressure, the engine is operated in the homogeneous combustion mode, otherwise, the engine is operated in a retarded combustion mode in which the ignition timing is retarded to ignite the fuel-air mixture after compression top dead center.

12 Claims, 7 Drawing Sheets

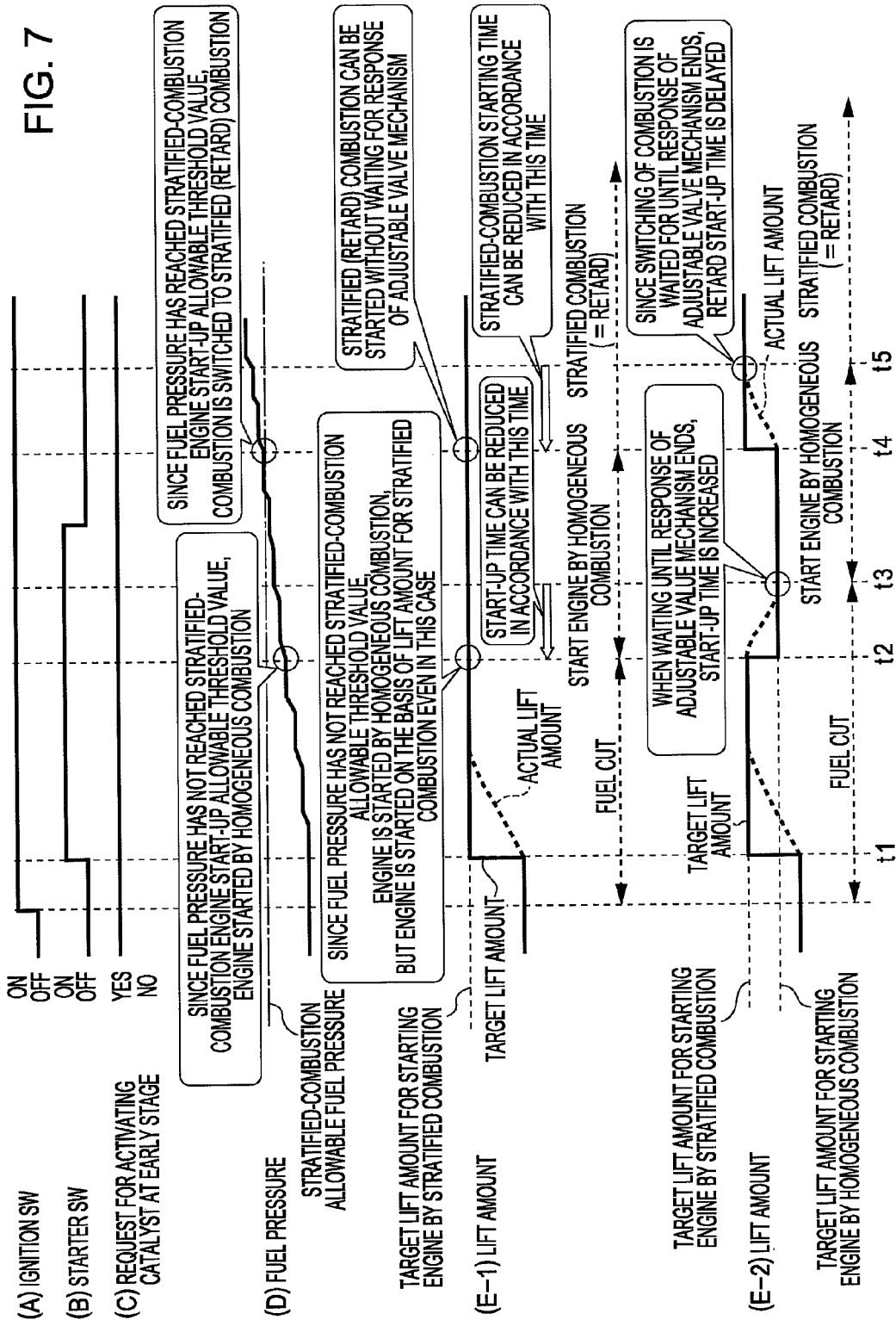

EXHAUST CONTROLLING DEVICE FOR DIRECT CYLINDER FUEL INJECTED SPARK IGNITION ENGINE

CROSS-REFERENCE TO RELATED APPLICATIONS

This application claims priority to Japanese Patent Application No. P2007-332276 filed Dec. 25, 2007, which is incorporated by reference herein in the entirety.

BACKGROUND OF THE INVENTION

1. Field of the Invention

The present invention relates to an exhaust controlling device of a direct cylinder fuel-injected spark-ignition engine.

2. Description of the Related Art

A related engine controlling device is available including an adjustable valve mechanism capable of adjusting a valve characteristic (e.g., valve timing or valve opening angle or valve lift) requested during stratified combustion to be different from a valve characteristic requested during homogeneous combustion. Homogeneous combustion is a combustion state or method preferred for normal operation of a four-stroke spark-ignition engine, while stratified combustion is a combustion state or method preferred during cold startup of the engine to enable quick heating of the catalytic converter for improving startup exhaust emissions performance of the engine. In many cases, homogenous combustion and stratified combustion require different valve characteristics. When a request is detected to be present to switch from homogeneous combustion to stratified combustion, a request for changing the valve characteristic may be made at the same time. In such a case, when the switching of the combustion state, and the changing of the valve characteristic are performed at the same time, a combustion state becomes unstable, as a result of which a switching shock may occur. Therefore, the prior art resolves this problem by switching the combustion state changing the valve characteristic.

When an engine is cold, the combustion method may be switched to stratified combustion, which excels in exhaust performance during the period shortly after starting the engine (i.e., while the exhaust piping and catalytic converter are cold) compared with homogeneous combustion. However, in the aforementioned related engine controlling device of the prior art, even in such a case, the combustion method is switched after changing the valve characteristic. Therefore, the switching of the combustion method is delayed, thereby deteriorating the exhaust performance.

SUMMARY OF THE INVENTION

An object of the present invention is to make it possible to prevent exhaust performance from deteriorating by reducing the time from when a request is detected to be present to switch combustion methods to when the combustion method is actually switched.

In one embodiment of the present invention, an engine exhaust controlling device for a four stroke engine including at least one cylinder and a piston disposed in the cylinder and connected to a crankshaft, is provided. The device includes a catalyst for removing pollutants from exhaust emitted by the engine, a fuel injection device for injecting fuel at a fuel pressure into the cylinder, an intake valve for supplying an intake air quantity of air to the cylinder, an ignition device for igniting a mixture of the fuel and the air in the cylinder at an ignition timing, an intake valve adjustment mechanism for adjusting the intake air quantity by changing one or both of the lift amount and the operating angle of the intake valve, and a controller for controlling the fuel injection device, the ignition device, and the intake valve adjustment mechanism, the controller being configured to determine whether or not a request is detected to be present for activating the catalyst when the engine is started, the controller being further configured to determine whether or not the fuel pressure is greater than or equal to a predetermined pressure. When the controller detects that a request is not present for activating the catalyst when the engine is started, the engine is operated in a homogeneous combustion mode in which the fuel is injected during the intake stroke and in which ignition timing is set to ignite the fuel-air mixture before compression top dead center. When the controller detects that a request is present for activating the catalyst when the engine is started, the intake valve adjustment mechanism is controlled so that one or both of the lift amount and the operating angle of the intake valve are larger than one or both of the lift amount and the operating angle of the intake valve when the request for activating the catalyst is not present, if the controller determines that the fuel pressure is not greater than or equal to the predetermined fuel pressure, the engine is operated in the homogeneous combustion mode, and if the controller determines that the fuel pressure is greater than or equal to the predetermined fuel pressure, the engine is operated in a retarded combustion mode in which the ignition timing is retarded to ignite the fuel-air mixture after compression top dead center and after the fuel has been injected.

In another embodiment of the present invention, an engine exhaust controlling device for a four stroke engine including at least one cylinder is provided. The device includes a catalyst for removing pollutants from exhaust emitted by the engine, fuel supplying means for directly supplying fuel at a fuel pressure into the cylinder, air intake means for supplying an intake air quantity of air to the cylinder, ignition means for igniting a mixture of the fuel and the air, intake air adjustment means configured to adjust the intake air quantity by changing a characteristic of the air intake means, and control means for controlling the fuel supplying means, the ignition means, and the intake air adjustment means, the control means determining whether or not a request is received for activating the catalyst when the engine is started, the control means further determining whether or not the fuel pressure is greater than or equal to a predetermined pressure. When a request is received for activating the catalyst when the engine is started, and the fuel pressure is greater than or equal to the predetermined pressure, the engine is operated in a retarded combustion mode in which the fuel-air mixture is ignited following compression top dead center and after the fuel has been supplied. When a request is received for activating the catalyst when the engine is started, and the fuel pressure is not greater than or equal to the predetermined pressure, the intake air adjustment means is adjusted the intake air quantity to be the same as in the retarded combustion mode and the engine is operated in a homogenous combustion mode in which the fuel supplying means supplies fuel during the intake stroke and in which the fuel-air mixture is ignited before compression top dead center.

In another embodiment of the present invention, an exhaust controlling method of a direct cylinder fuel-injected spark-ignition four stroke engine is provided. The method includes a catalyst activation request determining step for determining whether or not the engine is in an operating state in which a request is detected to be present for raising the temperature of a catalyst for removing pollutants from exhaust emitted by the engine, a combustion mode switching step for switching between a homogenous combustion mode and a retarded combustion mode depending on the operating state of the engine, the homogeneous combustion mode being a mode in which fuel is injected during the intake stroke and a mixture of fuel and air is ignited before compression top dead center, the retarded combustion mode being a mode in which the mixture of fuel and air is ignited following the compression top dead center and after injecting the fuel, and an intake air quantity controlling step in which a quantity of intake air is supplied to the engine based on a target intake air quantity that is set in accordance with whether the combustion mode is the homogenous combustion mode or the retarded combustion mode, the intake air quantity being set by controlling the lift or the operating angle of an intake valve of the engine. In the homogenous combustion mode, when the engine is in an operating state in which a request is detected to be present for raising the temperature of the catalytic converter when the engine is started or is in idle operation, the intake air quantity is set in the intake quantity controlling step to be larger than when the engine is in an operating state in which a request is not present for raising the temperature of the catalyst.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 7 is a time chart illustrating an operation for controlling the intake valve adjustment mechanism of an exhaust controlling device of the present invention when the engine is started and when the engine is in idle operation.

DESCRIPTION OF THE PREFERRED EMBODIMENTS

An embodiment of the present invention will be described in detail below with reference to the accompanying drawings.

Figure 1:
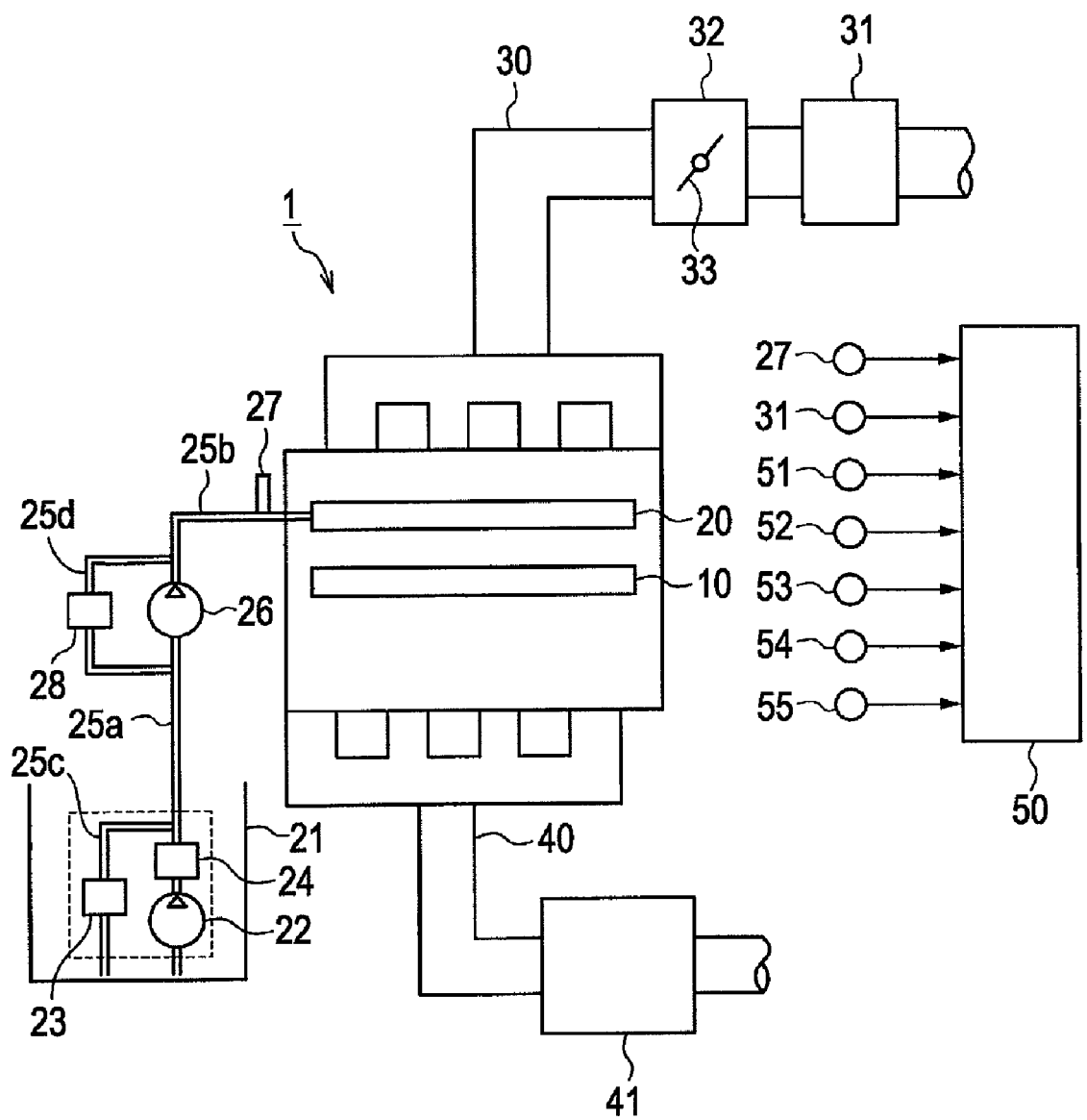
FIG. 1 shows a direct cylinder fuel-injected spark-ignition engine system including an embodiment of an exhaust controlling device of the present invention.

FIG. 1 shows a system including an exhaust controlling device of a direct cylinder fuel-injected spark-ignition engine 1 according to an embodiment of the present invention. The engine 1 comprises an ignition device 10, a fuel injection device 20, an intake path 30, and an exhaust path 40. The engine 1 is, for example, a four stroke engine, each cylinder having an intake stroke, which air is drawn into the cylinder as the piston moves to expand volume in the cylinder while the intake valve(s) are open, a compression stroke, in which air is compressed in the cylinder as the piston moves to decrease the volume in the cylinder while intake and exhaust valves are closed, a expansion stroke, during which a fuel-air mixture is combusted to force the piston to move to expand the volume in the cylinder while the intake and exhaust valves are closed, and an exhaust stroke, in which combustion products are forced out of the cylinder as the piston moves to decrease the volume in the cylinder while the exhaust valve(s) are open. As will be discussed herein, fuel can be injected into the cylinder near the end of the compression stroke, exactly in between the compression and expansion strokes, or near the start of the expansion stroke. Also, it is noted that the valve timing can be adjusted to depart from the typical valve states described in this paragraph.

The ignition device 10, for example a spark plug, ignites a mixture of fuel and air that is compressed in each cylinder. The fuel injection device 20 directly injects fuel into each cylinder using a high pressure injector. Fuel that is supplied to the fuel injection device 20 is stored in a fuel tank 21. An electric low pressure fuel pump 22, a low-pressure regulator 23, and a fuel filter 24 are built in the fuel tank 21 so as to be integrally formed into a module structure.

The fuel stored in the fuel tank 21 is drawn out by the low pressure fuel pump 22, and is discharged from the low-pressure fuel pump 22. The discharged low pressure fuel is filtered through the fuel filter 24, passes through a low pressure fuel path 25a, and is supplied to a high pressure fuel pump 26. The fuel discharged from the high pressure fuel pump 26 is supplied to the fuel injection device 20 through a high pressure, fuel path 25b. The high pressure fuel path 25b is provided with a fuel pressure sensor 27 that detects fuel pressure.

A high pressure regulator 28 is provided in a return path 25d that connects the high pressure fuel path 25b and the low pressure fuel path 25a to each other and that returns the fuel from the high pressure fuel path 25b to the low pressure fuel path 25a. Based on a signal from the fuel pressure sensor 27, using the high pressure regulator 28, the fuel pressure of the high pressure fuel path 25b continuously changes an opening area of the return path 25d, so that feedback control is performed with regard to a target fuel pressure in accordance with the operating state of the engine 1.

The fuel pressure of the fuel flowing through the low pressure fuel path 25a is adjusted by a low pressure regulator 23 provided at a return path 25c that returns the fuel to the fuel tank 21. The high pressure fuel pump 26 is a plunger-type fuel pump that is driven by the engine 1 and that can discharge the high pressure fuel when the engine has low rotational speed.

The intake path 30 is a path for supplying air to each cylinder. From an upstream side, the intake path 30 is provided with an air flow sensor 31 and an electronic control throttle 32. The air flow sensor 31 detects an intake air quantity being drawn into the engine 1. An electronic control throttle 32 drives a throttle valve 33 based on a control signal from a controller 50, to control a throttle opening in accordance with the operating state of the engine 1. In the embodiment, the intake air quantity is adjusted by an intake valve adjustment mechanism 100.

The exhaust path 40 is a path for exhausting exhaust gas (i.e., the products of fuel-air combustion from each cylinder) to the outside. The exhaust path 40 is provided with a catalytic converter 41. The catalytic converter 41 includes a catalyst that removes pollutants, such as unburned hydrocarbons, carbon monoxide, and nitrogen oxide, from the exhaust. As described herein, improved exhaust performance means the emission of exhaust having decreased amounts of pollutants after the catalytic converter 41.

In the present embodiment, the engine 1 has a plurality of cylinders. The embodiment of FIG. 1 shows an engine 1 having four cylinders arranged in-line. Each cylinder is coupled separately with the intake path 30 and the exhaust path 40. It is understood that the engine controlling device of the present invention is equally applicable to engines having any number of cylinders in any arrangement.

The controller 50 is a microcomputer comprising a central processing unit (CPU), a read only memory (ROM), a random access memory (RAM), and an input/output interface (I/O interface). In addition to a signal from the air flow sensor 31 and the fuel-pressure sensor 27, signals from, for example, a water temperature sensor 51, a crank angle sensor 52, an idle switch 53, an ignition switch 54, and a starter switch 55 are input to the controller 50.

The water temperature sensor 51 detects the water temperature of the engine 1. The crank angle sensor 52 detects the rotational speed of the engine 1 and a reference position of each cylinder. The crank angle sensor 52 outputs a position signal (POS signal) with each unit rotational angle of the engine crank shaft. The crank angle sensor 52 also outputs a reference signal (REF signal) at a reference position of the crank shaft. The controller 50 calculates the ignition timing and the fuel injection timing based on, for example, the POS signal and the REF signal. The idle switch 53 detects whether or not the engine 1 is in an idle operation as a result of being switched on when an accelerator pedal is not used. The ignition switch 54 and the starter switch 55 are sequentially switched on and off by turning in two steps an ignition key (not shown) that is operated by a driver of a vehicle in which the engine 1 is installed, the first step engaging the ignition switch 54, and the second step engaging the starter switch 55.

Figure 2:
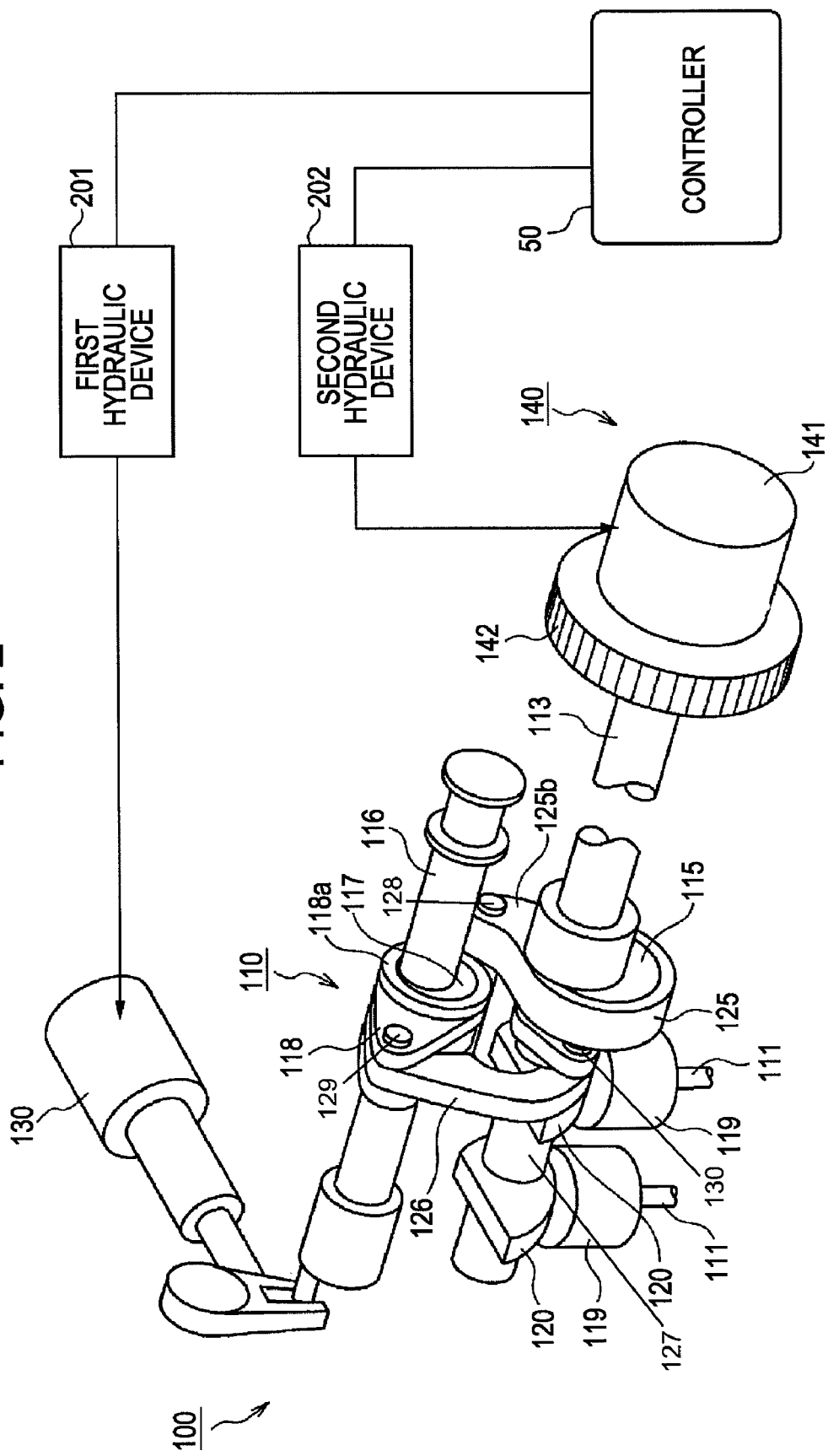
FIG. 2 is a perspective view of an embodiment of an intake valve adjustment mechanism for use in an exhaust controlling device of the present invention.

FIG. 2 is a perspective view of an embodiment of the intake valve adjustment mechanism 100 as used in an engine controlling device of the present invention. The intake valve adjustment mechanism 100 includes a lift/operation-angle variable mechanism 110 for varying the lift and/or the operation angle of an intake valve 111, and a phase variable mechanism 140 for varying the phase of the intake valve 111. The lift/operating-angle variable mechanism 110 changes the lift (the distance by which the intake valve 111 is lifted off its seat) and/or the operating angle (i.e., the number of crank angle degrees during which the intake valve 111 remains open) of the intake valve 111. The phase variable mechanism 140 advances or retards the phase of a center angle of opening of the intake valve 11, i.e., the crank angle position at which the intake valve 111 is maximally lifted. FIG. 2 schematically shows only a pair of the intake valves 111, corresponding to one engine cylinder, and related components.

First, the structure of the lift/operating-angle variable mechanism 110 will be described. In the depicted embodiment, each cylinder of the engine 1 is provided with a pair of the intake-valves 111 and a pair of exhaust valves (not shown). Of course, the lift/operating-angle variable mechanism 110 could also be applied to an engine having one, or more than two, intake and/or exhaust valves per cylinder. A hollow driving shaft 113 extends in a direction aligned with the cylinders of the engine 1 above the intake-valves 111. Through, for example, a sprocket 142, provided at one end of the driving shaft 113, the driving shaft 113 is connected to a crank shaft of the engine 1 by a timing belt or a timing chain (neither of which is shown). The sprocket 142 rotates around the longitudinal axis of the driving shaft 113 in response to the rotation of the crank shaft.

A pair of swinging cams 120 corresponding to each cylinder are rotatably mounted to the driving shaft 113. The pair of swinging cams 120 are swung back and forth in a predetermined rotational range around the driving shaft 113 as a center, the swinging cams 120 push corresponding valve lifters 119 at each of the intake valves 111, which are disposed respectively below the pair of swinging cams 120. Thus, the swinging motion of the cams 120 lifts the intake valves 111 off their seats and returns the intake valves 112 to their seats. Each pair of swinging cams 120 are fixed at the same phase by, for example, a circular cylinder 127.

A driving cam 115 is secured in an eccentric position to the outer periphery of the driving shaft 113 by, for example, press-fitting. The driving cam 115 is secured at a location that is separated from the swinging cams 120 by a predetermined distance along the driving shaft 113. A base end of a link arm 125 is rotatably fitted to the outer peripheral surface of the driving cam 115 such that the driving cam 115 can rotate within the link arm 125 to actuate the link arm 125 generally perpendicularly to the driving shaft 113. A control shaft 116 is rotatably supported obliquely away from the driving shaft 113 in the opposite direction from the cylinders, so as to extend substantially parallel to the in-line cylinders and the driving shaft 113.

A lift amount control actuator 130 is provided at one end of the control shaft 116 for rotating the control shaft 116 within a predetermined rotational angle range. The lift amount control actuator 130 is controlled by a first hydraulic device 201 based on a control signal from the controller 50 that detects the operating state of the engine 1. A control cam 117 is secured in an eccentric position to the outer peripheral surface of the control shaft 116 by, for example, press-fitting.

A rocker arm 118 is rotatably fitted to the outer peripheral surface of the control cam 117. The rocker arm 118 swings around an axial center of the control cam 117, allowing the control cam 117 to serve as a fulcrum. The rocker arm 118 extends perpendicularly to an axial direction of the control shaft 116, with a center base end 118a being supported by the control cam 117 serving as a center of rotation.

One end of the rocker arm 118 and a protruding end 125b of the link arm 125 are linked to each other by a linking pin 128 inserted into the one end of the rocker arm 118 and the protruding end 125b. The other end of the rocker arm 118 and one end of a link member 126 are linked to each other by a linking pin 129 inserted into the other end of the rocker arm 118 and the one end of the link member 126. The other end of the link member 126 and the swinging cam 120 are linked to each other by a linking pin 130 inserted into the other end of the link member 126 and the swinging cam 120.

The operation of the lift/operating-angle variable mechanism 110 is as follows. When the driving shaft 113 rotates in response to the movement of the crank shaft, the link arm 125 swings about the center point of the driving cam 115. The movement of the link arm 125 causes the control cam 117 and the rocker arm 118 fitted to the outer periphery of the control cam 117 to swing about the axis of the control shaft 116. The swinging of the rocker arm 118 is transmitted to the swinging cam 120 through the link member 126, so that the swinging cam 120 swings in a predetermined angular range. The swinging of the swinging cam 120 causes the valve lifter 119 to be actuated, thereby periodically lifting the intake valve 111 off its seat and allowing the intake valve 111 to its seat (i.e., opening and closing the intake valve 111 with respect to the cylinder.

When the control shaft 116 rotates through the lift amount control actuator 130, the center point of the control cam 117, serving as the swinging fulcrum of the rocker arm 118, is also rotationally displaced. This causes the supporting position of the rocker arm 118 to change with respect to the engine 1, and thereby, the initial swinging position of the swinging cam 120 can be varied. Therefore, by adjusting the rotational angle of the control shaft 116, an initial contact position of the swinging cam 120 with the valve lifter 119 can also be changed. Consequently, since the swinging angle of the swinging cam 120 per one rotation of the crank shaft is constant in this embodiment, a maximum lift amount of the intake valve 111 changes.

In sum, the intake valve adjustment mechanism 100 includes the driving shaft 113 which is configured to rotate in response to rotation of the crank shaft, the eccentric driving cam 115 rotationally driven together with the driving shaft 113, the link arm 125 rotatably supported by a peripheral surface of the eccentric driving cam 115, the control shaft 116 disposed substantially parallel to the driving shaft 113, the eccentric control cam 117 fixed to the control shaft 116 to rotate therewith, the rocker arm 118 rotatably supported by a peripheral surface of the control cam 117, the rocker arm being swingably driven by the link arm 125, and the link member 126 interconnecting between the rocker arm 118 and the swinging cam 120, which is configured to actuate the intake valve 111 via the lifter 119. When the driving shaft 113 is caused to rotate by rotation of the crank shaft, the driving cam 115 drives the link arm 125 generally inwardly and outwardly with respect to the driving shaft 113 causing the rocker arm 118 to swing back and forth on the control cam 117, the rocker arm 118 driving the link member 126 to move back and forth causing the swinging cam 120 to actuate the intake valve 111 via the lifter 119, such that rotatably moving the control shaft 116 changes the lift amount of the intake valve 111.

The operation and the structure of the phase variable mechanism 140 is as follows. The phase variable mechanism 140 includes a phase angle control actuator 141 and a second hydraulic device 202. The phase angle control actuator 141 rotates the sprocket 142 and the driving shaft 113 relative to each other in a predetermined angular range. The second hydraulic device 202 controls the phase angle control actuator 141 based on a control signal from the controller 50 that detects the operating state of the engine 100. Hydraulically controlling the phase angle control actuator 141 by the second hydraulic device 202 causes the sprocket 142 and the driving shaft 113 to rotate relative to each other, so that the lift center angle of the intake valve 111 is advanced or retarded with respect to the crank angle of the engine 1.

Figure 3:
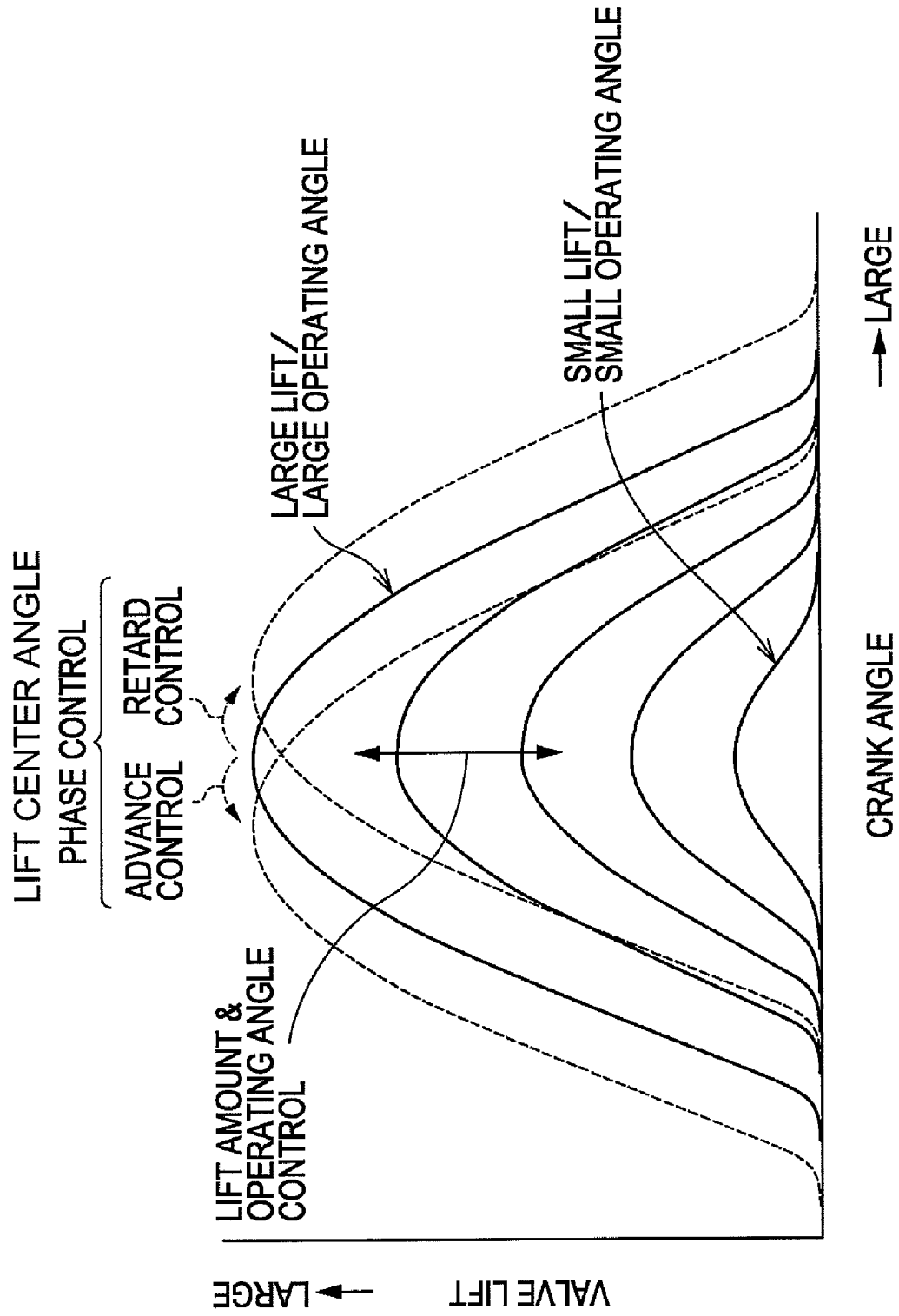
FIG. 3 illustrates the operation of the intake valve adjustment mechanism of FIG. 2.

FIG. 3 illustrates the operation of the intake valve adjustment mechanism 100. Because the initial position of the control cam 117 changes continuously as the driving shaft 113 is rotated, a valve lift characteristic of each intake valve 111 changes continuously. As shown by solid lines in FIG. 3, the intake valve adjustment mechanism 100 can concurrently increase or reduce the lift amount and the operating angle of the intake valve 111 by way of the lift/operating-angle variable mechanism 110. For example, a change in the magnitude of the operating angle and the lift amount of the intake valve 111 causes an open period and a closed period of the intake valve 111 to change substantially symmetrically with respect to the lift center angle (i.e., the crank angle at which the valve opening is at a maximum lift). In addition, as shown by broken lines in FIG. 3, the intake valve adjustment mechanism 100 can advance or retard the lift center angle by the phase variable mechanism 140.

By combining the lift/operating-angle variable mechanism 110 and the phase variable mechanism 140, the intake valve adjustment mechanism 100 can open and close the intake valve 111 at any crank angle position and for any number of crank angles. In this embodiment, the lift/operating-angle variable mechanism 110 and the phase variable mechanism 140 are controlled at the same time to regulate the intake air quantity based on a target intake air quantity calculated in accordance with the operating state of the engine 1.

In one embodiment, the engine exhaust valves are provided only with a phase variable mechanism 140, so that the phase of the central angle of each exhaust valve can be arbitrarily advanced or retarded with respect to the respective intake valves. This allows the opening/closing period of each exhaust valve to be arbitrarily set with respect to each corresponding intake valve 111 on a cylinder by cylinder basis.

In accordance with the operating state of the engine 1, the combustion method can be switched between stratified combustion and homogeneous combustion. The term "stratified combustion" refers to combustion that is carried out by injecting fuel during the compression stroke of the piston and igniting the resultant fuel-air mixture before the piston reaches compression top dead center and while the fuel is unevenly distributed near the ignition device 10. The term "homogeneous combustion" refers to combustion that is performed by injecting fuel during the intake stroke of the piston and forming a gas mixture having a substantially uniform air-fuel ratio in the entire combustion chamber which is then ignited when the piston is near compression top dead center at a crank angle between near the end of the compression stroke and near the start of the expansion stroke.

In one embodiment, during idle operation when the engine is cold, the combustion method is switched to retarded combustion, which is a different state or method of combustion from the aforementioned stratified combustion and homogeneous combustion. Retarded combustion is a combustion method in which an ignition timing is set at or following compression top dead center and in which fuel is injected before the ignition by the ignition device 10. The timing at which the ignition device 10 initiates ignition of the fuel-air mixture is referred to as ignition timing.

Retarded combustion is performed to improve the emission performance of the engine exhaust. Retarded combustion results is a slight increase in the amount of unburned hydrocarbons being exhausted by the engine; those unburned hydrocarbons are then after-burned in the catalytic converter, releasing the heat of combustion to activate the catalyst in the catalyst more quickly. Thus, at an early stage of operation when the engine is cold, exhaust performance can be effective improved by retarding the ignition timing. To maximize the effect, ignition is preferably performed at and following compression top dead center.

Figure 4:
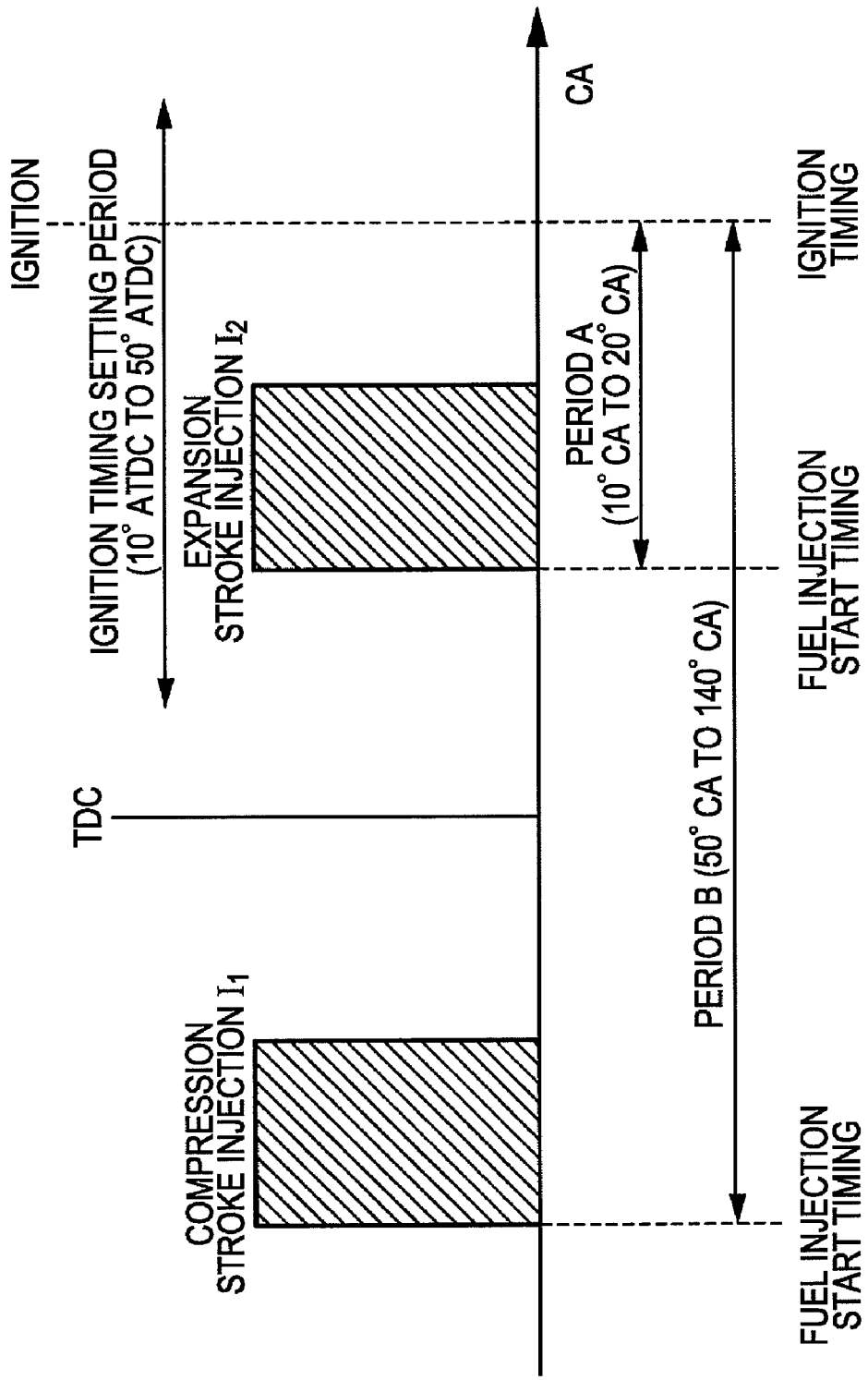
FIG. 4 illustrates an example of ignition timing and fuel injection timing when an engine is operated in a retarded combustion state by an exhaust controlling device of the present invention.

A retarded combustion ignition timing and fuel injection period are described with reference to FIG. 4, which illustrates an example of the ignition timing and the fuel injection timing of retarded combustion as a function of crank angle (indicated as "CA" in the figure). As shown in FIG. 4, the ignition timing is set from ten degrees after top dead center (10° ATDC) to fifty degrees after top dead center (50° ATDC) following compression top dead center. The fuel injection timing is set so that fuel is separately injected twice, once during the intake stroke and again during the expansion stroke. By setting the ignition timing from 10° ATDC to 50° ATDC, and considerably retarding the ignition timing, a sufficient after-burning effect can be obtained in the catalytic converter for activating the catalyst at an early stage and thereby reducing the exhaust density of hydrocarbons and other pollutants emitted to the outside after the catalytic converter. In other words, some fuel remains unburned when leaving the engine and travels with the exhaust to the catalytic converter. The catalytic converter is hot enough to cause the fuel to combust, which causes the temperature of the catalytic converter to rapidly increase and facilitates reduction of the hydrocarbons in the exhaust expelled to the outside.

For stabilizing combustion during ignition at or following compression top dead center, the combustion period needs to be reduced. Therefore, it is necessary to increase the combustion speed (i.e., the flame speed). One way to increase the combustion speed is by increasing cylinder turbulence. Cylinder turbulence can be generated and/or increased by fuel-spray energy as fuel is injected at a high pressure into each cylinder. When the fuel (and/or air) is injected into the cylinder, the molecules move very fast in response to the fast influx of the high pressure fuel (and/or air), thereby causing the contents of the cylinder to become turbulent. Turbulent fuel/air mixtures burn faster than non-turbulent mixtures.

For retarded combustion according to one embodiment, the cylinder turbulence that is generated by a first fuel injection $I_1$, performed during the compression stroke before the compression top dead center, gradually decays at or following compression top dead center. Therefore, a second fuel injection $I_2$ is carried out during the expansion stroke following compression top dead center. Therefore, the residual cylinder turbulence that is generated by the first fuel injection $I_1$ can be increased by way of the second fuel injection $I_2$. Therefore, even if the ignition timing is considerably retarded, fuel is injected immediately prior to ignition by the ignition device 10, to increase the cylinder turbulence, thereby increasing the combustion speed. Therefore, combustion can be stabilized.

Figure 5:
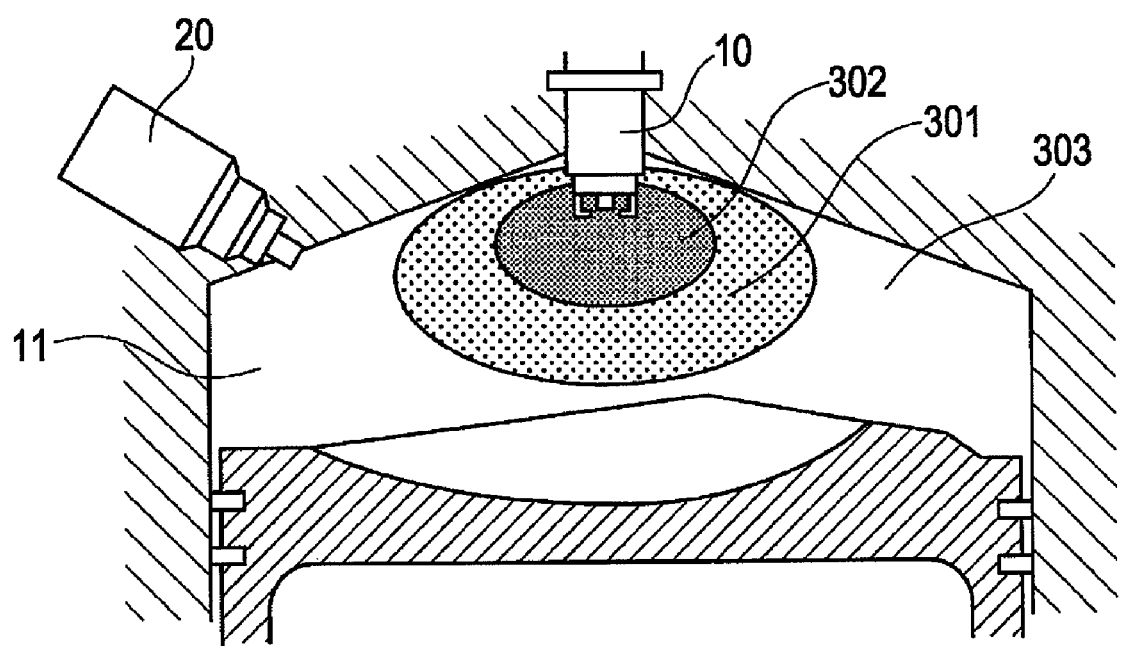
FIG. 5 illustrates schematically a state in which a gas mixture is formed in an engine combustion chamber when retarded combustion is performed.

FIG. 5 illustrates a state in which a gas mixture is formed in the combustion chamber when the retarded combustion is performed. As shown in FIG. 5, the first fuel injection 1 performed during the compression stroke, causes a rich first mixture mass 301 having a relatively high fuel-air ratio to be formed near the ignition device 10. The second fuel injection 12, performed during the expansion stroke, causes a richer second mixture mass 302 to be formed in the interior of the rich first mixture mass 301, which was formed by the first fuel injection $I_1$. A gas layer 303, to which a substantial amount of fuel has not spread, is formed outside of the rich first mixture mass 301. The air-fuel ratio of the entire fuel chamber 11 is set to slightly lean (i.e., the air-fuel ratio of the entire fuel chamber 11 is preferably set in the range of about 16 to about 17) compared with a theoretical (stoichiometric) air-fuel ratio (i.e., an air-fuel ratio of about 14.7).

In the stratified combustion state, the second mixture mass 302 is ignited by the ignition device 10, so that retarded combustion is performed. The fuel-rich layers 302 and 301 cause some of the hydrocarbons to remain uncombusted, while the fuel-lean overall mixture provides the oxygen necessary for afterburning of the unburned hydrocarbons. For improving exhaust performance, it is desirable that, when the engine is cold, the combustion method be quickly switched to retarded combustion, to activate the catalytic converter at an early stage.

When retarded combustion is performed, the ignition timing is considerably retarded compared with when homogeneous combustion is performed, and as a result, engine torque is correspondingly reduced, which also reduces the rotational speed of the engine. Therefore, when retarded combustion is performed, the intake air quantity (and thus the corresponding amount of fuel injected) is increased as compared with when the homogeneous combustion is performed, to prevent the engine torque from being reduced. This maintains the rotational speed of the engine at an idle rotational speed. In one embodiment, the intake air quantity is adjusted by controlling the lift/operating-angle variable mechanism 110 and the phase variable mechanism 140. Therefore, the target lift amount in homogeneous combustion is smaller than the target lift amount in retarded combustion in which an intake air quantity is increased.

However, in idle operation, when the target lift amount in homogeneous combustion differs from the target lift amount in retarded combustion, the certain problems can arise. For example, after starting the engine when performing homogeneous combustion, when the combustion method is switched to retarded combustion, a misfire or the like may occur until the lift amount matches the target lift amount. Under those circumstances, the combustion method cannot be switched immediately to retarded combustion. This causes a time lag to occur from when a command is given to switch to retarded combustion until the combustion method is actually switched to retarded combustion. Retarded combustion is performed to increase exhaust performance (i.e., reduction of pollutants emitted from the catalytic converter) by increasing exhaust temperature and activating the catalyst in the catalytic converter at an early stage. Therefore, when a time lag occurs before the combustion method is actually switched to retarded combustion, the exhaust performance is correspondingly worsened.

Accordingly, in one embodiment, when a request is detected to be present to activate the catalyst at an early stage and the engine is started in the homogeneous combustion state, the target lift amount is set to a high value in order to reduce the time lag for switching the combustion state to retarded combustion. Thus, when a command is given to switch to retarded combustion, the combustion method can be immediately switched.

Figure 6:
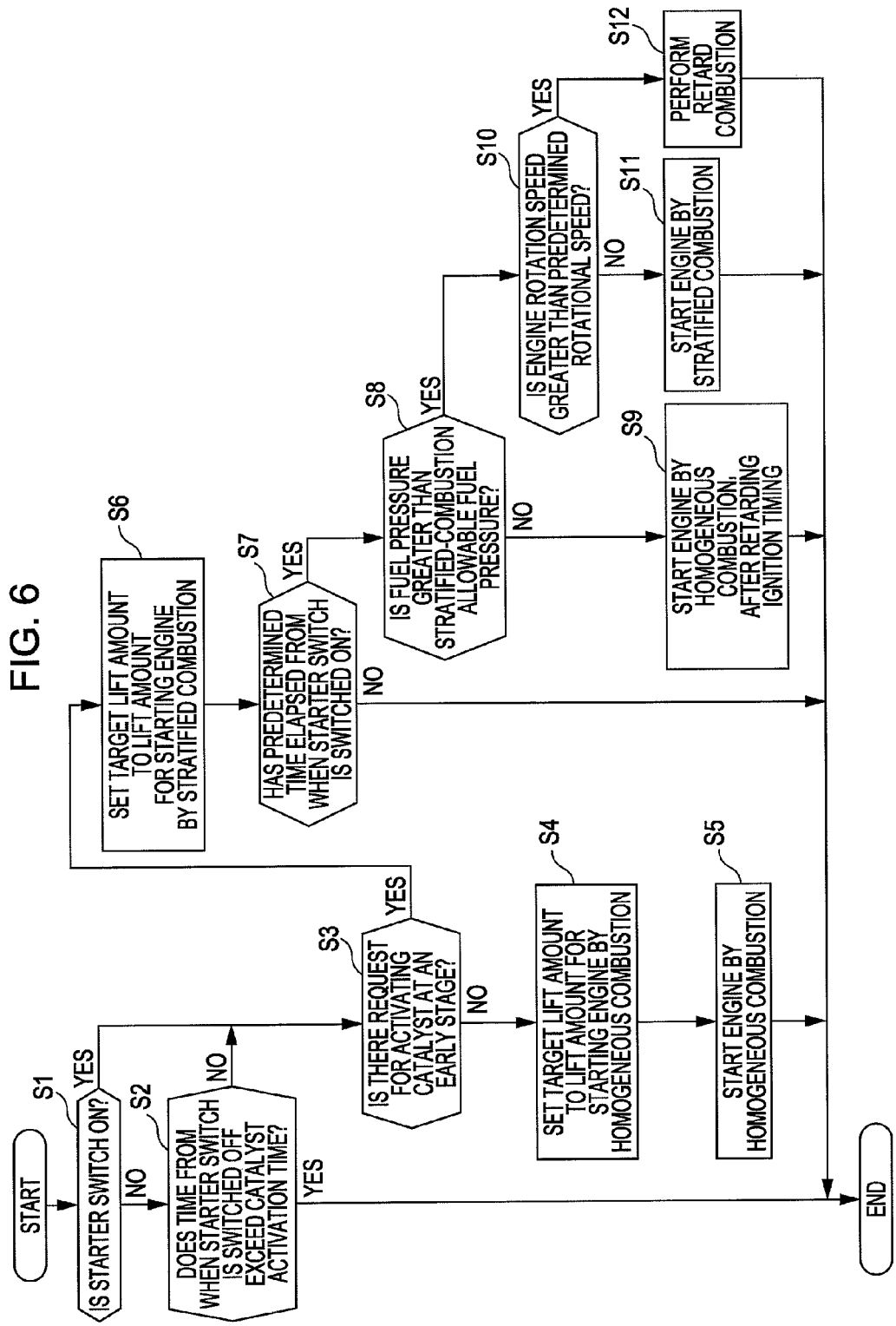
FIG. 6 is a flowchart illustrating an operation for controlling the intake valve adjustment mechanism of an exhaust controlling device of the present invention when the engine is started and when the engine is in idle operation.

A controlling operation of the intake valve adjustment mechanism 100 when the engine is started and is in idle operation will be described below. FIG. 6 is a flowchart illustrating a controlling operation of the intake valve adjustment mechanism 100 of the engine 1 when starting the engine and when the engine is in idle operation. When the ignition switch 54 is switched on, the controller 50 starts a routine and repeatedly executes the routine at a predetermined computation period.

In Step S1, the controller 50 determines whether or not the starter switch 55 is on. When the controller 50 determines that the starter switch 55 is on, the process proceeds to Step S3; when the controller 50 determines that the starter switch 55 is off, the process proceeds to Step S2.

In Step S2, the controller 50 determines whether or not an amount of time equal to or exceeding a catalyst activation time has elapsed since the starter switch 55 was switched off (but while the ignition switch 54 remains on, so that the engine 1 is operating). The catalyst activation time is an approximate time required for catalyst in the catalytic converter to be activated after the starter switch 55 is switched off, and is a variable time that is set based on, for example, a detected or estimated catalyst temperature or a retard amount. The lower the catalyst temperature or the retard amount, the longer the catalyst activation time. The required predetermined time may be set to, for example, approximately 2 seconds to approximately 30 seconds. If the controller 50 determines that the catalyst activation time has elapsed, the controller 50 determines that warming of the engine 1 is completed, in order to end the current process. In contrast, when the controller 50 determines that the catalyst activation time has not elapsed, the process proceeds to Step S3.

As a method of detecting or estimating the catalyst temperature, when, for example, a catalyst temperature sensor is provided, the catalyst temperature can be detected with the catalyst temperature sensor. An activation determination temperature at this time may be, for example, a predetermined temperature in a range of from 600° C. to 800° C. When a catalyst temperature sensor is not provided, the catalyst temperature can be estimated from the water temperature of the engine or based a combination of the engine water temperature when starting the engine and the intake air quantity after starting the engine.

After completing the warming of the engine, stratified combustion is performed in a predetermined operation area of low speed, low load operation, to yield good gas mileage. Otherwise, homogeneous combustion is performed in a predetermined operation area of low speed, high load operation, or high speed, high load operation, to yield high engine power output.

In Step S3, the controller 50 determines whether or not there is a request for activating the catalyst at an early stage (i.e., whether or not a request to activate the catalyst at an early stage is present). If the controller 50 determines that there is no request for activating the catalyst at an early stage (i.e., the controller 50 detects that a request is not present), the process proceeds to Step S4. In contrast, if the controller 50 determines that there is a request for activating the catalyst at an early stage, the process proceeds to Step S6. In one embodiment, to determine whether or not there is a request for activating the catalyst at an early stage, it is determined whether or not the detected or estimated catalyst temperature is greater than the predetermined activation temperature.

In Step S4, the controller 50 sets the target lift amount of the intake valve 111 to a target lift amount for starting the engine by homogeneous combustion. In Step S5, the controller 50 starts the engine by homogeneous combustion. Accordingly, when there is no request for activating the catalyst at an early stage, the process proceeds to Steps S4 and S5 to set the target lift amount of the intake valve 111 to the target lift amount for starting the engine by homogeneous combustion, and the engine is started by homogeneous combustion. When the engine is started by stratified combustion in which fuel is injected during a compression stroke, the engine cannot be started until the fuel pressure reaches a predetermined stratified-combustion allowable fuel pressure. Therefore, in particular, when there is no request for activating a catalyst at an early stage, the engine is started by homogeneous combustion so that it is not necessary to wait for the fuel temperature to rise. This makes it possible to quickly start the engine.

In Step S6, the controller 50 sets the target lift amount of the intake valve 111 to a target lift amount for starting the engine by stratified combustion. In the depicted embodiment, the target lift amount for starting the engine by stratified combustion is set equal to the target lift amount for retarded combustion so that the combustion method can be switched to retarded combustion immediately after starting the engine.

In Step S7, the controller 50 determines whether or not a predetermined time has elapsed from when the starter switch 55 was switched on. The predetermined time is set considering, for example, a delay in response of the lift amount control actuator 130 of the intake valve adjustment mechanism 100. When the controller 50 determines that the predetermined time has not passed, the routine ends. In contrast, when the controller 50 determines that the predetermined time has passed, the routine proceeds to Step S8.

In Step S8, the controller 50 determines whether or not the fuel pressure is greater than a predetermined stratified combustion allowable fuel pressure. When the controller 50 determines that the fuel pressure is less than the predetermined stratified combustion allowable fuel pressure, the process proceeds to Step S9. In contrast, when the controller 50 determines that the fuel pressure is greater than the predetermined stratified-combustion allowable fuel pressure, the process proceeds to Step S10.

In Step S9, while the target lift amount of the intake valve 111 is maintained at the target lift amount for starting the engine by stratified combustion, the controller 50 starts the engine by homogeneous combustion after retarding the ignition timing with respect to an ignition timing that is ordinarily set when starting the engine by homogeneous combustion. The reasons are as follows.

Proceeding to Step S9 means that it is desirable to start the engine by stratified combustion because there is a request for activating the catalyst. This is because, compared with homogeneous combustion in which fuel is homogeneously spread in each cylinder, stratified combustion can restrict production of wall flow in each cylinder. Therefore, starting the engine by stratified combustion can use a fuel injection amount smaller than that when starting the engine by homogeneous combustion. As a result, the catalyst can be increased in temperature more quickly by after-burning hydrocarbons not burned in the fuel-rich zones near the ignition device and that amount of unburned hydrocarbons emitted from the catalytic converter can be reduced due to the overall lean mixture that is combusted, making it possible to improve exhaust performance.

However, without an embodiment of the present invention, improving exhaust performance in this manner would not be possible. On the one hand, waiting for the fuel pressure to rise to the stratified combustion allowable fuel pressure after the passage of the predetermined time from when the starter switch 55 was switched on would cause too much time to elapse before starting the engine. On the other hand, when the target lift amount for the intake valve 111 is set to the target lift amount for starting the engine by homogeneous combustion, starting the engine by homogeneous combustion, and then switching to retarded combustion for activating a catalyst cannot be accomplished until adjustment of the intake valve adjustment mechanism 100 is completed. Therefore, the activation of the catalyst would delayed, thereby reducing exhaust performance.

Accordingly, in the depicted embodiment of the present invention, while maintaining the target lift amount of the intake valve 111 at the target lift amount for starting the engine by stratified combustion, the engine is operated by homogeneous combustion, to reduce the engine starting time, and to eliminate a time lag of the intake valve adjustment mechanism 100 when the homogeneous combustion is switched to retarded combustion. When homogeneous combustion is performed while the target lift amount is maintained at the target lift amount for starting the engine by stratified combustion, the intake air quantity may become too large, thereby excessively increasing the engine torque. Therefore, in the embodiment, the ignition timing is retarded to reduce the engine torque, to eliminate the excess torque corresponding to an amount resulting from the increase in the intake air quantity.

In Step S10, the controller 50 determines whether or not the engine rotational speed is greater than a predetermined rotational speed. If the controller 50 determines that the engine rotational speed is less than the predetermined rotational speed, the process proceeds to Step S11. In contrast, if the controller 50 determines that the engine rotational speed is greater than the predetermined rotational speed, the process proceeds to Step S12.

In Step S11, the controller 50 starts the engine by ordinary stratified combustion. Therefore, until the engine rotational speed exceeds the predetermined engine rotational speed, stratified combustion is performed to ensure the engine is able to be started. In Step S12, the controller 50 operates the engine by retarded combustion.

FIG. 7 is a time chart illustrating the controlling operation of the intake valve adjustment mechanism 100 when starting the engine and when the engine is in idle operation according to the present embodiment. For clarifying the correspondences with the flowchart of FIG. 6, the description of the timelines in FIG. 7 include the step numbers corresponding to the steps of the flowchart of FIG. 6.

When, at a time t1, the starter switch 55 is switched on ((B) in FIG. 7; "Yes" in Step S1), the controller 50 determines whether or not there is a request for activating the catalyst at an early stage (Step S3). At time t1, there is a request for activating a catalyst at an early stage ((C) in FIG. 7; "Yes" in Step S3), so that the controller 50 sets the target lift amount of the intake valve 111 to a target lift amount that is larger than that in homogeneous combustion when there is no request for activating the catalyst. In the embodiment, the target lift amount is set to a target lift amount for starting the engine by stratified combustion when there is a request for activating the catalyst at an early stage ((E-1) in FIG. 7; Step S6). Then, the lift amount of the intake valve 111 is controlled so as to match the target lift amount ((E-1) in FIG. 7).

When, at a time t2, the elapsed time from when the starter switch 55 is switched on reaches the predetermined time ((B) in FIG. 7; "Yes" in Step S7), the controller 50 determines whether or not the fuel pressure has reached the stratified-combustion allowable fuel pressure (Step S8). The stratified-combustion allowable fuel pressure may be, for example, on the order of about 2 MPa to about 3 MPa, because the determination of whether the fuel pressure is normally raised is performed quickly timing. When the fuel pressure that is produced by performing a two-time fuel injection into each cylinder is, for example, on the order of about 10 MPa to about 12 MPa, a fuel pressure approximating these values may define a stratified combustion fuel pressure allowable condition. If, at the time t2, the fuel pressure has not reached the stratified combustion allowable fuel pressure ((D) in FIG. 7; "No" in Step S8), the controller 50 starts the engine by homogeneous combustion by retarding the ignition timing while the target lift amount of the intake valve 111 is maintained at the target lift amount for starting the engine by stratified combustion (Step S9).

In the present embodiment, the controller 50 determines whether or not the fuel pressure has reached the stratified combustion allowable fuel pressure by detecting the actual fuel pressure with the fuel pressure sensor 27. However, it is possible to measure a time from when the engine is started or for increasing the rotational speed of the engine, to estimate the rise in fuel pressure, to determine whether or not the fuel pressure has reached the stratified combustion allowable fuel pressure. When the fuel pressure has not reached the stratified combustion allowable fuel pressure even though the predetermined time has passed from when the starter switch 55 is switched on, the engine is started by homogeneous combustion instead of by stratified combustion, so that the engine can be quickly started.

Since the target lift amount is maintained at the target lift amount for starting the engine by stratified combustion, when the combustion method is switched to retarded combustion for activating the catalyst after the engine is started, it is not necessary to change the lift amount. Therefore, when the fuel pressure reaches the stratified combustion allowable fuel pressure (time t4), the combustion method can be immediately switched to retarded combustion. Consequently, since retarded combustion can be performed from a very early stage, the catalyst can be activated at an early stage, thereby making it possible to improve exhaust performance.

When homogeneous combustion is performed while the target lift amount is maintained at the target lift amount for starting the engine by stratified combustion, the intake air quantity becomes too large, as a result of which the engine torque is excessively increased. However, reducing the engine torque by retarding the ignition timing can eliminate the excess torque corresponding to an amount resulting from the increase in the intake air quantity.

When, at a time t3, the starter switch 55 is switched off ((B) in FIG. 7; "No" in Step S1), the controller 50 determines whether or not the catalyst activation time has passed (Step S2). As mentioned above, the catalyst activation time is an approximate time required for a catalyst to be activated after the starter switch 55 is turned off, and is a variable that is set based on, for example, a detected or estimated catalyst temperature or ignition retard amount. Therefore, the catalyst activation time has not passed while there is a request for activating the catalyst at an early stage.

Since, at the time t3, the fuel pressure has not reached the stratified combustion allowable fuel pressure ((D) in FIG. 7), homogeneous combustion is subsequently performed ((E-1) in FIG. 7; "Yes" in Steps S2, S3, and S7, and "No" in Step S8) while the target lift amount of the intake valve 111 is maintained at the target lift amount for starting the engine by stratified combustion.

When, at the time t4, the fuel pressure reaches the stratified-combustion allowable fuel pressure ((D) in FIG. 7; "Yes" in Step S8), the controller 50 determines whether or not the engine rotational speed is greater than the predetermined rotational speed (Step 10). In one embodiment, the predetermined engine rotational speed is slightly less than the idle rotational speed. At the time t4, the engine is in idle operation, and the engine rotational speed is maintained at the idle rotational speed ("Yes" in Step S10), so that the controller 50 causes the combustion method to switch from the homogeneous combustion to retarded combustion (Step S12).

With regard to a related invention, as shown in (E-2) in FIG. 7, when, at the time t2, the starting of the engine by stratified combustion is canceled in order to start the engine by homogeneous combustion, the target lift amount of the intake valve 111 is set to a small lift amount for starting the engine by homogeneous combustion. In addition, the lift amount of the intake valve 111 is controlled so as to become the target lift amount. Therefore, when, at the time t4, a command is given to switch to retarded combustion, and the target lift amount is set to a large lift amount for retarded combustion, the combustion method cannot be switched to the retarded combustion until a time t5 at which the response of the intake valve adjustment mechanism 100 is completed.

In contrast, in an embodiment of the present invention, as in (E-1) in FIG. 7, even if, at the time t2, the starting of the engine by stratified combustion is canceled in order to start the engine by homogeneous combustion, the target lift amount of the intake valve 111 is set to the large lift amount for retarded combustion. Therefore, when, at the time t4, a command is given to shift to retarded combustion, the combustion method can be immediately switched to retarded combustion.

Accordingly, if a request is detected to be present to activate the catalyst at an early stage, when the engine is started by homogeneous combustion, the lift amount of the intake valve 111 is set to the lift amount that is set for retarded combustion, which is greater than the lift amount that is set when the engine is started by homogeneous combustion. Thus, when the combustion method is switched to retarded combustion after the engine is started by homogeneous combustion, the lift amount is already set to the lift amount for retarded combustion. As a result, the combustion method can be switched without waiting for the response of the intake valve adjustment mechanism 100 to be completed. That is, no time lag occurs between when a command is given to switch the combustion method to when the combustion method is actually switched. When a request is detected to be present to activate the catalyst at an early stage, retarded combustion can be performed from an earlier stage. Consequently, exhaust temperature is raised to induce activation of the catalyst at the early stage, so that exhaust performance can be improved.

The present invention is not limited to the above-described embodiment, so that it is obvious that various modifications can be made within the scope of the technical idea of the present invention.

For example, although, in the embodiment, the fuel pressure is detected with a fuel pressure sensor, it is possible to measure, for example, the water temperature or the elapsed time since starting the engine, so that the rise in the fuel pressure can be estimated to determine whether or not the fuel pressure has reached the stratified combustion allowable fuel pressure based on the estimation.

In the embodiment, the target lift amount for starting the engine by stratified combustion is set to a lift amount that is equal to the target lift amount for retarded combustion. However, if the target lift amount is set greater than the target lift amount for starting the engine by homogeneous combustion, the time lag from when a command is given to switch the combustion method to when the combustion method is actually switched can be reduced. Therefore, the exhaust performance can be increased.

Further, if, in particular, the target lift amount for starting the engine by stratified combustion is set near an intermediate value between the target lift amount that is set when retarded combustion is performed and the target lift amount that is set for starting the engine by homogeneous combustion, it is possible to prevent an excessive increase of the engine rotational speed caused by an increase in air quantity while relatively reducing the time lag from when a command is given to switch the combustion method to when the combustion method is actually switched. Still further, since the lift amount is small, and the flow rate of intake air flowing into each cylinder can be increased, the flow in each cylinder can be increased. Therefore, the combustion can be stabilized.

In retarded combustion according to the embodiment, fuel is injected at two times, once during the compression stroke and again during the expansion stroke. However, the fuel may be injected once either in the compression stroke or in the expansion stroke. Alternatively, the fuel may be injected two times in the compression stroke.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. An engine exhaust controlling device for a four stroke engine including at least one cylinder and a piston disposed in the cylinder and connected to a crankshaft, the device comprising:
   a catalyst for removing pollutants from exhaust emitted by the engine;
   a fuel injection device for injecting fuel at a fuel pressure into the cylinder;
   an intake valve for supplying an intake air quantity of air to the cylinder;
   an ignition device for igniting a mixture of the fuel and the air in the cylinder at an ignition timing;
   an intake valve adjustment mechanism for adjusting the intake air quantity by changing one or both of the lift amount and the operating angle of the intake valve; and
   a controller for controlling the fuel injection device, the ignition device, and the intake valve adjustment mechanism, the controller being configured to detect whether or not a request is present for activating the catalyst when the engine is started, the controller being further configured to determine whether or not the fuel pressure is greater than or equal to a predetermined pressure;
   wherein when the controller detects that a request is not present for activating the catalyst when the engine is started, the engine is operated in a homogeneous combustion mode in which the fuel is injected during the intake stroke and in which ignition timing is set to ignite the fuel-air mixture before compression top dead center; and
   wherein when the controller detects that a request is present for activating the catalyst when the engine is started, the intake valve adjustment mechanism is controlled so that one or both of the lift amount and the operating angle of the intake valve are larger than one or both of the lift amount and the operating angle of the intake valve when the request for activating the catalyst is not present,
      wherein when the controller determines that the fuel pressure is not greater than or equal to the predetermined fuel pressure, the engine is operated in the homogeneous combustion mode; and
      wherein when the controller determines that the fuel pressure is greater than or equal to the predetermined fuel pressure, the engine is operated in a retarded combustion mode in which the ignition timing is retarded to ignite the fuel-air mixture after compression top dead center and after the fuel has been injected.

2. The engine exhaust controlling device according to claim 1, wherein when a request is detected to be present for activating the catalyst when the engine is started, one or both of the lift amount and operating angle of the intake valve in the homogenous combustion mode are adjusted by the intake valve adjustment mechanism to be equal to one or both of the lift amount and operating angle of the intake valve in the retarded combustion mode.

3. The engine exhaust controlling device according to claim 1, wherein when a request is detected to be present for activating the catalyst when the engine is started and the fuel pressure is not greater than or equal to the predetermined fuel pressure such that the engine is operated in the homogenous combustion mode, the intake air quantity supplied to the cylinder is controlled based on a target intake air quantity substantially equal to about half of a target intake air quantity that is set when the engine is operated in the retarded combustion mode.

4. The engine exhaust controlling device according to claim 1, wherein when a request is detected to be present for activating the catalyst when the engine is started and the fuel pressure is not greater than or equal to the predetermined fuel pressure, or when the engine is in idle operation, such that the engine is operated in the homogenous combustion mode, the ignition timing is retarded so as to eliminate an increase in engine torque that would otherwise occur due to the increased intake air quantity provided by one or both of the larger intake valve lift amount and the larger operating angle.

5. The engine exhaust controlling device according to claim 1, wherein the intake valve adjustment mechanism comprises:
   a driving shaft configured to rotate in response to rotation of the crank shaft;
   an eccentric driving cam rotationally driven together with the driving shaft;
   a link arm rotatably supported by a peripheral surface of the eccentric driving cam;
   a control shaft disposed substantially parallel to the driving shaft;
   an eccentric control cam fixed to the control shaft to rotate therewith;
   a rocker arm rotatably supported by a peripheral surface of the control cam, the rocker arm being swingably driven by the link arm; and
   a link member interconnecting between the rocker arm and a swinging cam configured to actuate the intake valve;
   wherein when the driving shaft is caused to rotate by rotation of the crank shaft, the driving cam drives the link arm generally inwardly and outwardly with respect to the driving shaft causing the rocker arm to swing back and forth on the control cam, the rocker arm driving the link member to move back and forth causing the swinging cam to actuate the intake valve, such that rotatably moving the control shaft changes the lift amount of the intake valve.

6. An engine exhaust controlling device for a four stroke engine including at least one cylinder, the device comprising:
   a catalyst for removing pollutants from exhaust emitted by the engine;
   fuel supplying means for directly supplying fuel at a fuel pressure into the cylinder;
   air intake means for supplying an intake air quantity of air to the cylinder;
   ignition means for igniting a mixture of the fuel and the air;
   intake air adjustment means configured to adjust the intake air quantity by changing a characteristic of the air intake means; and
   control means for controlling the fuel supplying means, the ignition means, and the intake air adjustment means, the control means determining whether or not a request is received for activating the catalyst when the engine is started, the control means further determining whether or not the fuel pressure is greater than or equal to a predetermined pressure;
   wherein when a request is received for activating the catalyst when the engine is started, and the fuel pressure is greater than or equal to the predetermined pressure, the engine is operated in a retarded combustion mode in which the fuel-air mixture is ignited following compression top dead center and after the fuel has been supplied; and
   wherein when a request is received for activating the catalyst when the engine is started, and the fuel pressure is not greater than or equal to the predetermined pressure, the intake air adjustment means is adjusted the intake air quantity to be the same as in the retarded combustion mode and the engine is operated in a homogenous combustion mode in which the fuel supplying means supplies fuel during the intake stroke and in which the fuel-air mixture is ignited before compression top dead center.

7. The engine exhaust controlling device according to claim 6, wherein if the fuel pressure is less than the predetermined fuel pressure, when the engine is operated in the homogeneous combustion mode, the ignition means is controlled to retard the ignition timing so as to decrease engine torque by an amount equal to the increase in engine torque caused by controlling the intake air quantity to be the same as in the retarded combustion mode.

8. An exhaust controlling method of a direct cylinder fuel-injected spark-ignition four stroke engine, the method comprising:
   a catalyst activation request determining step for determining whether or not the engine is in an operating state in which a request is detected to be present for raising the temperature of a catalyst for removing pollutants from exhaust emitted by the engine;
   a combustion mode switching step for switching between a homogenous combustion mode and a retarded combustion mode depending on the operating state of the engine, the homogeneous combustion mode being a mode in which fuel is injected during the intake stroke and a mixture of fuel and air is ignited before compression top dead center, the retarded combustion mode being a mode in which the mixture of fuel and air is ignited following the compression top dead center and after injecting the fuel; and
   an intake air quantity controlling step in which a quantity of intake air is supplied to the engine based on a target intake air quantity that is set in accordance with whether the combustion mode is the homogenous combustion mode or the retarded combustion mode, the intake air quantity being set by controlling the lift or the operating angle of an intake valve of the engine;
   wherein in the homogenous combustion mode, when the engine is in an operating state in which a request is detected to be present for raising the temperature of the catalyst when the engine is started or is in idle operation, the intake air quantity is set in the intake quantity controlling step to be larger than when the engine is in an operating state in which a request is not present for raising the temperature of the catalyst.

9. The exhaust controlling method according to claim 8, wherein when a request is detected to be present for raising the temperature the catalyst when the engine is started, the lift amount or the operating angle of the intake valve in the homogenous combustion mode is adjusted in the intake air quantity controlling step to be equal to the lift amount or operating angle of the intake valve in the retarded combustion mode.

10. The exhaust controlling method according to claim 8, further comprising a fuel pressure determining step in which it is determined whether or not the pressure of fuel being supplied to the engine is greater than or equal to a predetermined pressure.

11. The exhaust controlling method according to claim 10, wherein when a request is detected to be present for raising the temperature of the catalyst when the engine is started and the fuel pressure is not greater than or equal to the predetermined fuel pressure, the combustion mode switching step switches the engine to the homogenous combustion mode and the intake air quantity controlling step controls the intake air quantity based on a target intake air quantity substantially equal to about half of a target intake air quantity that is set when the engine is switched to the retarded combustion mode.

12. The exhaust controlling method according to claim 10, further comprising an ignition timing adjusting step in which the timing of ignition of the fuel-air mixture can be adjusted, wherein when a request is detected to be present for raising the temperature of the catalyst when the engine is started and the fuel pressure is not greater than or equal to the predetermined fuel pressure, or when the engine is in idle operation, the combustion mode switching step switches the engine to the homogenous combustion mode and the ignition timing adjusting step retards the ignition timing so as to eliminate an increase in engine torque that would otherwise occur due to the increased intake air quantity provided by the larger intake valve lift amount or operating angle.

* * * * *